J. F. JOHNSON & E. G. PARSONS.
Hay-Rake.
No. 223,921. Patented Jan. 27, 1880.
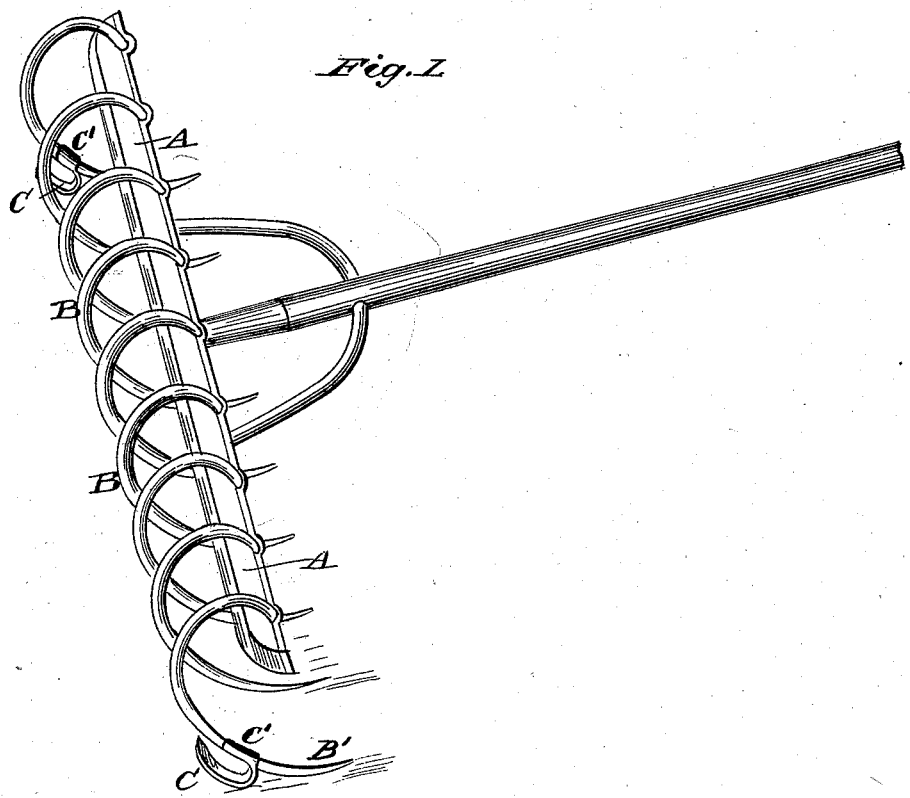
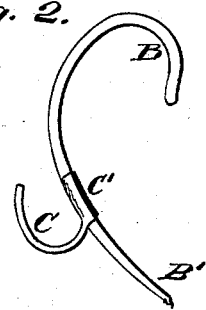

UNITED STATES PATENT OFFICE.

JOSEPH F. JOHNSON AND ELIJAH G. PARSONS, OF YOKUM STATION, VA.

HAY-RAKE.

SPECIFICATION forming part of Letters Patent No. 223,921, dated January 27, 1880.

Application filed December 19, 1878.

*To all whom it may concern:*

Be it known that we, JOSEPH F. JOHNSON and ELIJAH G. PARSONS, of Yokum Station, in the county of Lee and State of Virginia, have invented certain new and useful Improvements in Hay-Rakes; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a rake embodying our improvement; and Fig. 2 represents one of the rake-teeth with its sleeved guard detached from the rake-head.

Similar letters of reference indicate corresponding parts in both the figures.

Our improvement relates to that class of hand hay-rakes which are provided upon two or more of their teeth with projecting guards or curved runners, designed to elevate the points of the rake-teeth by simply tilting the rake-handle toward an upright position a sufficient distance above the ground to permit the points to pass over the trash and stubble; and it consists in the detailed construction of detachable sleeved guards and their combination with the curved metallic rake-teeth, as hereinafter more fully described, and particularly pointed out in the claims.

In the drawings, A is the rake-head, which is provided with the curved teeth B B, made of spring-wire or similar suitable material. The two outermost teeth or end teeth are provided each with a recurved guard, C, which is made in one piece with a sleeve, C', by means of which it may affixed upon the tooth by simply slipping it over its point B' and upon the thick part or shank of the tooth, as clearly shown in the drawings. When the sleeved guards are in this position upon the rake they will raise the points of all the rake-teeth slightly above the ground when the rake is tilted upward, so as to cause the guards to bear against the ground; and the advantage of making them detachable is that they may be applied to rakes of the ordinary kind already in use, and may readily be removed and replaced when desired. It is also cheaper to make the guards in a separate part from the tooth than to split the tooth to form the guard, or make the guard separately and then weld it on, which is apt to destroy the spring or temper of the tooth.

Having thus described our improvement, we claim and desire to secure by Letters Patent of the United States—

1. In a hand-rake, the combination, with the rake-head A and curved spring-teeth B, of the detachable sleeved guards C, substantially as and for the purpose herein shown and set forth.

2. As an article of manufacture, a detachable point-guard for hand-rakes, composed of the curved guard C, provided with the sleeve C', substantially as and for the purpose herein shown and described.

In testimony that we claim the foregoing as our own we have hereto affixed our signatures in presence of two witnesses.

JOSEPH F. JOHNSON.
ELIJAH G. PARSONS.

Witnesses:
CRAIG PENNINGTON,
MITCHAEL CECIL.